Aug. 5, 1952
F. F. LINDSTAEDT
2,605,588
RESILIENT CONNECTOR FOR COMBINATION
FLOWERPOT AND WATERING PAN
Filed Feb. 24, 1948
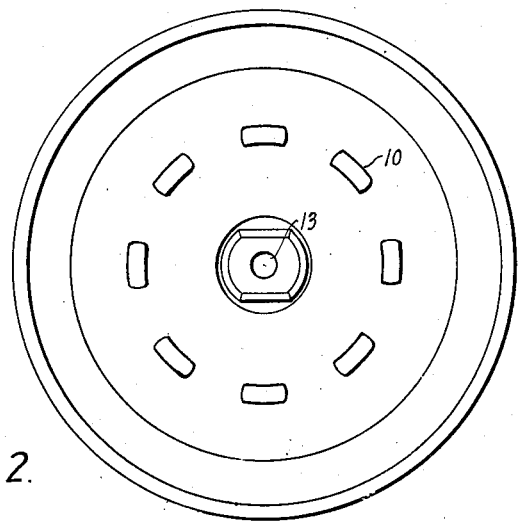
Fig. 2.
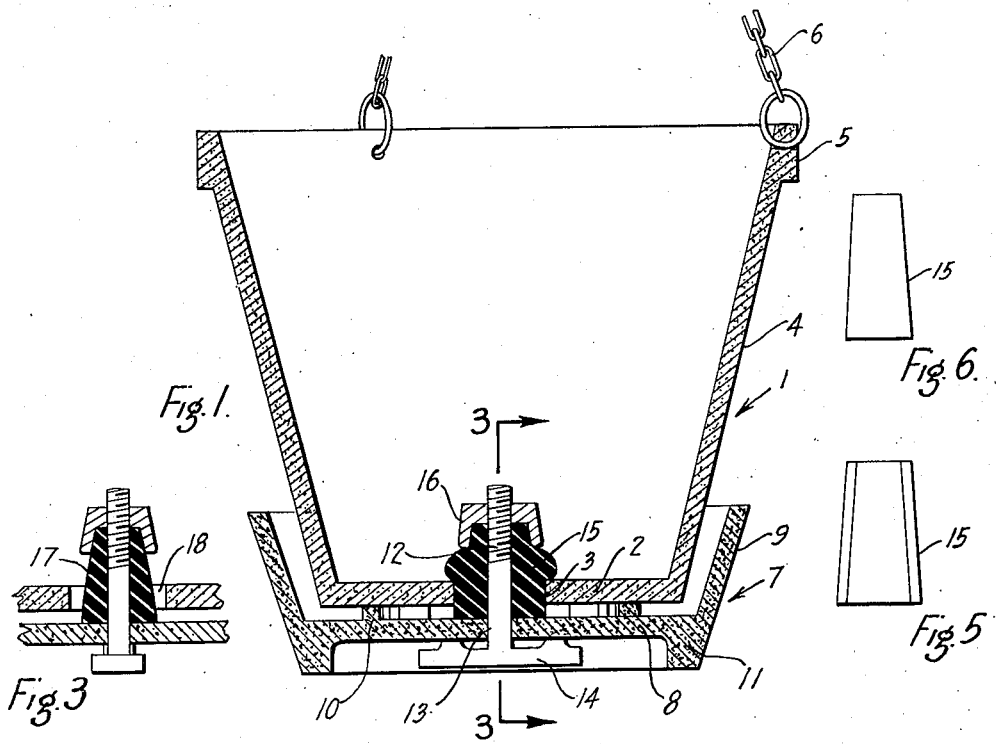
INVENTOR.
Frank F. Lindstaedt
BY
R. Schapp
ATTORNEY Patented Aug. 5, 1952

2,605,588

UNITED STATES PATENT OFFICE 2,605,588

RESILIENT CONNECTOR FOR COMBINATION FLOWERPOT AND WATERING PAN

Frank F. Lindstaedt, San Anselmo, Calif.

Application February 24, 1948, Serial No. 10,285

1 Claim. (Cl. 47—38)

The present invention relates to improvements in a resilient connector for combination flower pot and watering pan and its principal object is to provide a means for detachably securing the watering pan to the pot.

More particularly my invention is intended for use in connection with hanging flower pots and it is proposed to provide a pan securing means that is entirely carried by the pan and does not involve any structural change in the conventional flower pot equipped with the usual central hole in the bottom thereof.

It is further proposed to provide a combination as hereinabove set forth in which the pan may serve as a reservoir of water and in which water disposed in the pan has free access to the flower pot through the bottom hole.

It is a further object of the present invention to utilize the hole in the bottom of the flower pot and its margin as an anchoring means whereby the pan is secured upon the bottom of the flower pot, and to arrange the anchoring means in such a manner that it can be manipulated for attaching and for detaching the pan from below the bottom of the pan, without requiring access to the fastening means from within the pot.

Further objects and advantages of my invention will appear as the specification proceeds, and the novel features of my invention will be fully defined in the claim attached hereto.

The preferred form of my invention is illustrated in the accompanying drawing, in which Figure 1 shows a vertical central section through my combination flower pot and watering pan, Figure 2, a plan view of my watering pan, Figure 3, a vertical section taken along line 3—3 of Figure 1, Figure 4, a plan view of a washer used in my invention, Figure 5, a side view of the washer, and Figure 6, a side view of the same washer taken at a right angle to that of Figure 5.

While I have shown only the preferred form of my invention, I wish to have it understood that various changes and modifications may be made within the scope of the claim attached hereto without departing from the spirit of the invention.

Referring to the drawing in detail, my flower pot 1 may be of conventional form and comprises a flat bottom 2 having a central hole 3, a conical side wall 4 expanding toward the top and terminating in a reinforcing flange 5, which may be used as an anchoring means for a plurality of chains 6 by means of which the pot is suspended in a conventional manner.

The watering pan 7 comprises a flat bottom 8, somewhat larger in diameter that the bottom of the flower pot, an annular conical water-retaining flange 9 spaced from the lower end of the flower pot, a series of ribs 10 adapted to space the pan from the bottom of the flower pot, and a downwardly projecting annular flange 11 adapted to space the bottom of the pan from a supporting surface sufficiently for accommodation of the lower portion of the anchoring means presently to be described.

The anchoring means comprises in its main features a bolt 12 extending through a hole 13 in the bottom of the pan and having a wing head 14 bearing on the bottom surface of the pan, a washer 15 encircling the bolt above the pan, and a cap 16 threaded on the bolt and adapted to bear on the upper end of the washer.

The head 14 is shaped with wings for convenient manipulation and is dimensioned for accommodation within the space defined by the annular bottom flange 11.

The washer 15 is generally conical in shape and is of sufficient length to extend through a considerable distance above the bottom of the flower pot when positioned in the manner shown, with its bottom resting on the bottom of the pan and its body portion projecting through the hole 3 in the bottom of the flower pot.

The radial dimensions of the washer are such that the portion of the washer disposed in the hole 3 of the flower pot has a snug fit with the margin of the hole, and opposite sides of the washers are cut away, as at 17, to provide passages 18 through which water may enter from the pan into the pot. The washer is preferably made of fairly soft rubber or similar compressible material.

The cap 16 is preferably made to fit the upper end of the washer so that it is held against rotation by the latter when the bolt is turned for drawing the cap downward. The cap and the washer are dimensioned so that the entire assembly may be introduced through the hole 3 from below without requiring access from the upper end of the pot.

In use, the bolt, the washer and the cap are assembled in connection with the watering pan to form a unit therewith and may be sold in the market in assembled form for use with any conventional form of flower pot having the proper dimensions.

For applying the pan, the user merely lifts the pan toward the bottom of the pot in properly centered relation so as to cause the upper end of the bolt, the cup and the upper end of the washer to pass through the hole 3. After the ribs 10 have been brought into contact with the bottom of the flower pot, the operator turns the head of the bolt for drawing the cap downward, and the descending cap compresses the washer axially, causing side portions below the cap to expand laterally and to bulge outward, with the bulges bearing on the top surface of the flower pot bottom so as to support and anchor the pan with respect to the flower pot.

Since opposite side wall portions of the washers are cut away, sufficiently large portions of the hole 3 will remain clear for the passage of water from the pan into the pot.

Since the entire operation does not require any access through the open end of the flower pot, it is apparent that the pan may be readily applied to a pot that is filled with soil and has a plant growing therein for which purpose it may be necessary to scrape out a little soil through the bottom hole to provide space for the anchoring means.

While the flower pot and the watering pan may be made of any suitable material, my invention is particularly intended for use in connection with the conventional flower pot made of earthenware.

I claim:

A plate assembly comprising a horizontally disposed plate having a relatively small hole therein, a bolt having a head bearing on the lower face of the plate and having a shank projecting through the hole, a resilient washer surrounding the shank above the plate and having a lower face bearing on the latter, a second plate disposed in face to face relation with the first plate and having a larger hole through which the washer extends, with a portion of the washer extending above said plate but stopping short of the upper end of the bolt, one of the plates having rigid means for spacing the plates with respect to one another, and a nut threaded on the upper end of the bolt and bearing on the upper end of the washer for expanding the washer material above the second plate to bear on the upper surface of the latter and to hold the first plate suspended from the second plate when the nut is screwed downward, the washer being generally frusto-conical in shape with the small end of the washer presented upwardly to facilitate insertion of the washer through the hole of the second plate, and having flattened side portions adapted to provide for leakage around the washer when the latter is compressed.

FRANK F. LINDSTAEDT.

REFERENCES CITED

The following references are of record in the file of this patent:

UNITED STATES PATENTS

| Number | Name | Date |
| --- | --- | --- |
| 155,525 | Landers | Sept. 29, 1874 |
| 1,624,504 | Pfarr | Apr. 12, 1927 |
| 1,648,570 | White | Nov. 8, 1927 |
| 1,789,616 | Bjorklund | Jan. 20, 1931 |
| 2,120,599 | Brown | June 18, 1938 |
| 2,277,885 | Rodanet | Mar. 31, 1942 |
| 2,365,372 | Allen | Dec. 19, 1944 |
| 2,417,178 | Ritter | Mar. 11, 1947 |